United States Patent [19]

See

[11] 3,851,982

[45] Dec. 3, 1974

[54] SHOCK CUSHIONING MOUNTING MEANS FOR VEHICLE ATTACHMENTS

[75] Inventor: George L. See, East Peoria, Ill.

[73] Assignee: Caterpillar Tractor Co., Peoria, Ill.

[22] Filed: Aug. 10, 1972

[21] Appl. No.: 279,695

[52] U.S. Cl.............. 403/224, 403/379, 280/150 C, 296/102

[51] Int. Cl................................................ F16b 7/18

[58] Field of Search........ 287/20 R, 85 R, 189.36 F, 287/103 R, 119 R; 248/9; 280/150 C; 296/102; 279/97, 86; 37/142 A, 142 R; 299/92; 403/224, 379

[56] References Cited
UNITED STATES PATENTS

| 147,925 | 2/1874 | Firth | 279/97 |
|---|---|---|---|
| 1,917,431 | 7/1933 | Clark | 37/142 R |
| 2,092,372 | 9/1937 | Goeller | 287/114 X |
| 2,463,124 | 3/1949 | Sims | 287/119 R |
| 2,545,913 | 3/1951 | Bock | 287/103 R |
| 3,258,283 | 6/1966 | Winberg | 287/119 R |
| 3,560,019 | 2/1971 | Moore | 287/85 R |
| 3,707,788 | 1/1973 | Sturgeon | 299/92 X |

Primary Examiner—Andrew V. Kundrat
Attorney, Agent, or Firm—Philips, Moore, Weissenberger, Lempio & Strabala

[57] ABSTRACT

There is disclosed a cushioned mounting assembly for the attachment of canopies and the like to vehicles. The mounting means comprises a base member telescopically coupled to a support member, with resilient cushioning means pretensioned between the members. Means are provided within the mounting means to adjust the pretension of the resilient means.

8 Claims, 5 Drawing Figures

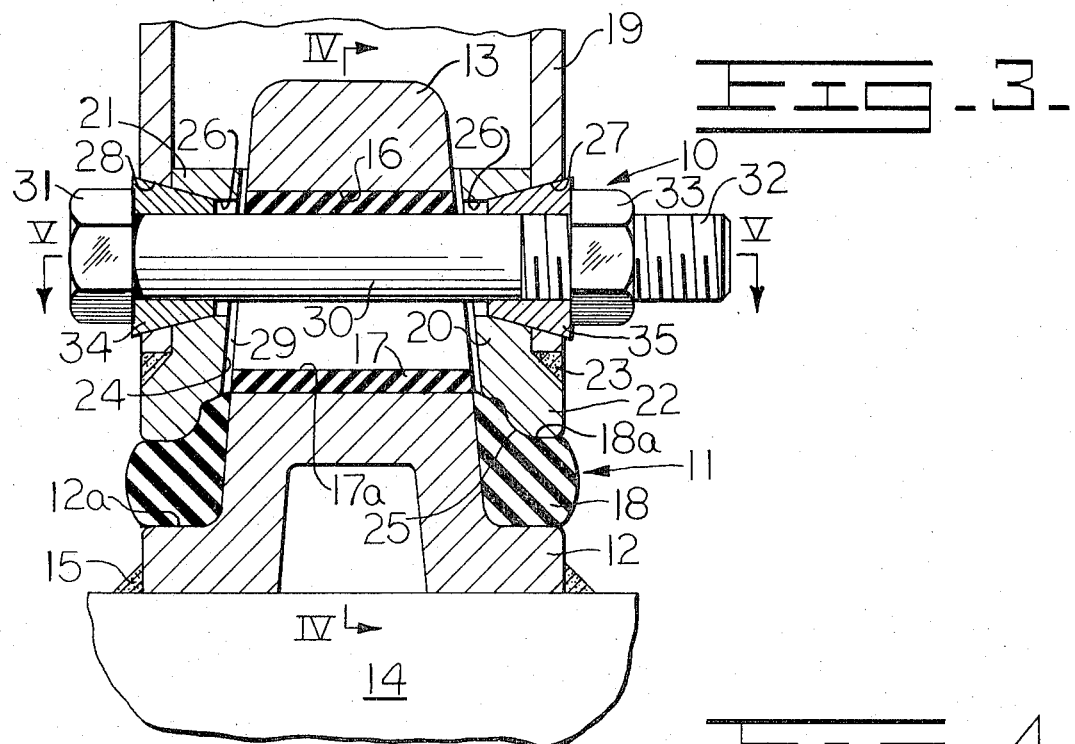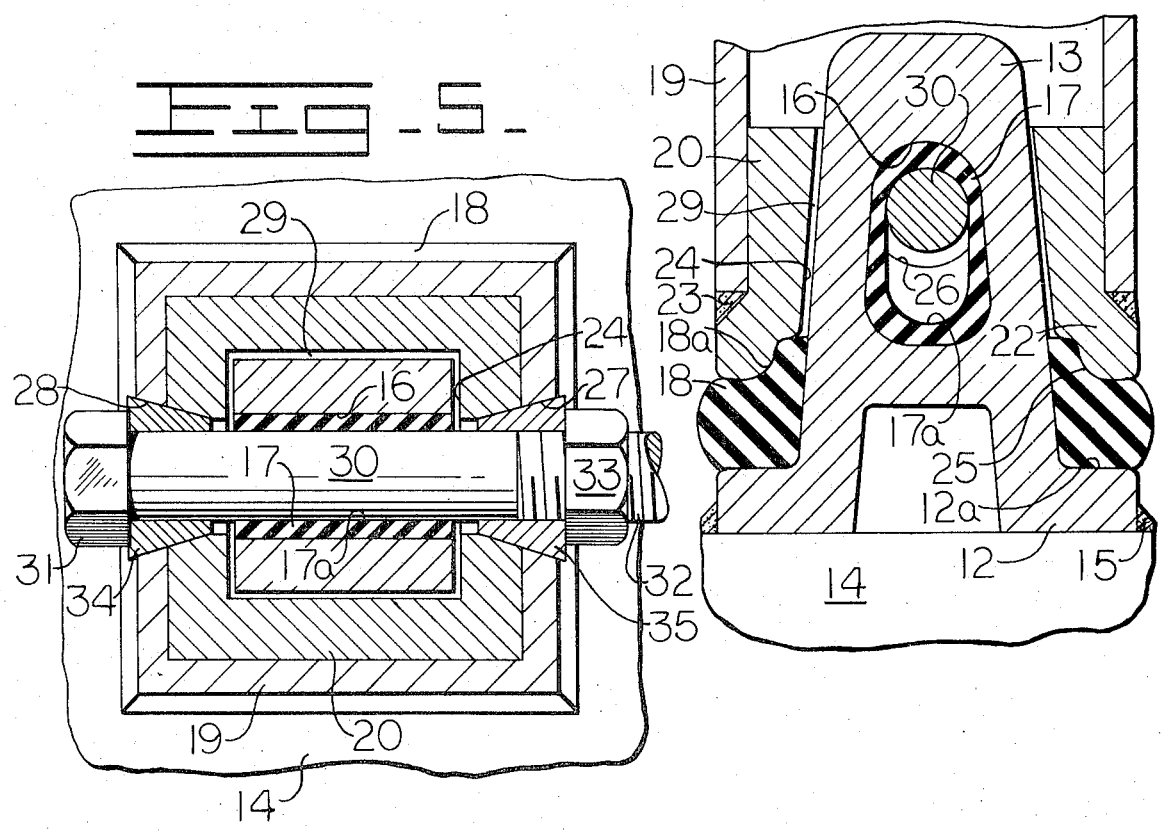

SHOCK CUSHIONING MOUNTING MEANS FOR VEHICLE ATTACHMENTS

BACKGROUND OF THE INVENTION

The present invention is directed to supports and pertains particularly to machine mounts having means to absorb vibration and shock for the attachment of accessories such as canopies and the like to vehicles.

Rollover protective structures are now quite common requirements on earth-working and construction equipment. Such structures employ a high strength frame extending over the operator station to protect him from falling objects, and from injury should the vehicle be overturned.

Attachments to vehicles are constantly subjected to shock and vibration. Such shock and vibration is especially severe in earth-working and other off-the-road vehicles. This shock is generally of such intensity and magnitude that the attachments normally have a short life.

Further problems and prior art efforts to overcome them are detailed in U.S. Pat. No. 3,500,019, issued Feb. 2, 1971 to J. C. Moore. The prior art devices recognize the need to provide resilient mounting means for vehicle attachments. It has also been found that the resilient means must be preloaded to a certain degree.

It is customary with the prior art devices to preload the mounts for ROPS structures and the like by placing weights on top of the structure in an attempt to compress the resilient material sufficiently to allow insertion of retaining bolts. Another method is to place a chain around the ROPS structure and a portion of the vehicle in an attempt to tie down the structure sufficiently to preload the resilient mounting and allow insertion of the retainer bolts. These methods are time consuming and unwieldy, and often fail to achieve proper alignment, resulting in damage to the bolt or the resilient member.

SUMMARY OF THE INVENTION

It is the primary object of the present invention to provide vehicle attachments with resilient mounting means that overcomes the above problems of the prior art.

Another object of the present invention is to provide vehicle attachment mounting means that includes built-in preloading means.

A further object of the present invention is to provide mounting means that includes self adjusting preloading means.

In accordance with the present invention, mounting means for a vehicle attachment is provided with resilient means and includes means to preload the resilient means.

BRIEF DESCRIPTION OF THE DRAWINGS

The above and other objects and advantages of the present invention will become apparent from the following specification when read in conjunction with the accompanying drawings, wherein:

FIG. 3 is like FIG. 2, showing the mounting means in adjusted position;

FIG. 4 is a sectional view taken generally along lines IV—IV of FIG. 3; and,

FIG. 5 is a sectional view taken generally along lines V—V of FIG. 3.

DETAILED DESCRIPTION OF PREFERRED EMBODIMENTS

Figure 1:
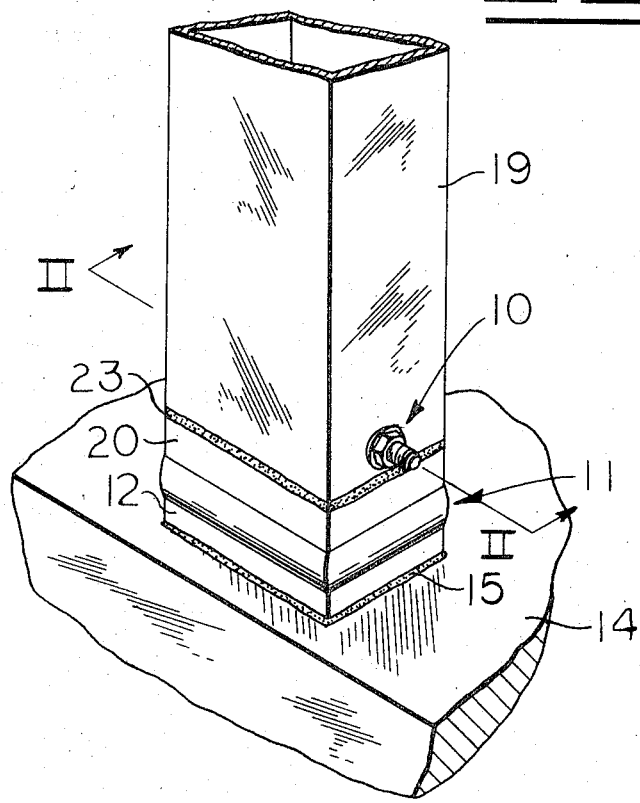
FIG. 1 is a perspective view of an attachment incorporating mounting means in accordance with the present invention.

Referring particularly to the drawings, there is illustrated an apparatus for preloading a resilient mount embodying the principles of the present invention, generally indicated by the reference numeral 10, and operatively combined with a resilient mounting assembly generally designated by the reference numeral 11.

The resilient mounting assembly 11 comprises a flanged base member 12 having means defining a shoulder 12a and an upwardly extending pin or bayonet portion 13. The base member 12 is secured to a frame member 14 of a vehicle in any suitable manner, such as bolting or, for example, by welding as indicated at 15. The bayonet portion 13 includes a transversely extending oblong bore or elongated slot 16 which is lined with a liner 17 of suitable resilient material such as urethane. The bayonet portion 13 is of uniformly decreasing cross-sectional area, for reasons as will be hereinafter described. A ring 18 of suitable resilient material, such as natural rubber or urethane, is disposed around the lower portion of the bayonet 13 in contact with the shoulder 12a of member 12. The ring 18 has a contoured recessed upper surface 18a for purposes explained later.

A support member 19, such as the lower end portion of a tubular post of a canopy or rollover protective structure, includes a mounting sleeve 20 having a portion 21 which is telescoped inside the lower end of member 19, with a mounting portion 22 extending from the lower end of the post. The mounting sleeve 20 is secured to the post by any suitable method such as welding, indicated at 23. The mounting sleeve defines a channel or socket 24 extending centrally therethrough, which is of uniformly upwardly decreasing cross-sectional area corresponding generally to the cross-sectional area of bayonet 13, thus making it possible for the mounting sleeve to fit down on the bayonet 13 in telescoping relation, with a tight fit. The lower end of the mounting sleeve includes a contoured shoulder 25, having a surface corresponding to the contoured surface 18a of the ring 18. The lower end of the post 19 and the mounting sleeve 20 is provided with a relatively large diameter transversely extending bore 26, coaxial with the oblong bore 16, and which terminates at opposite ends with tapered counterbores 27 and 28, which define camming means and extend to the outer surface of the post 19.

Figure 2:
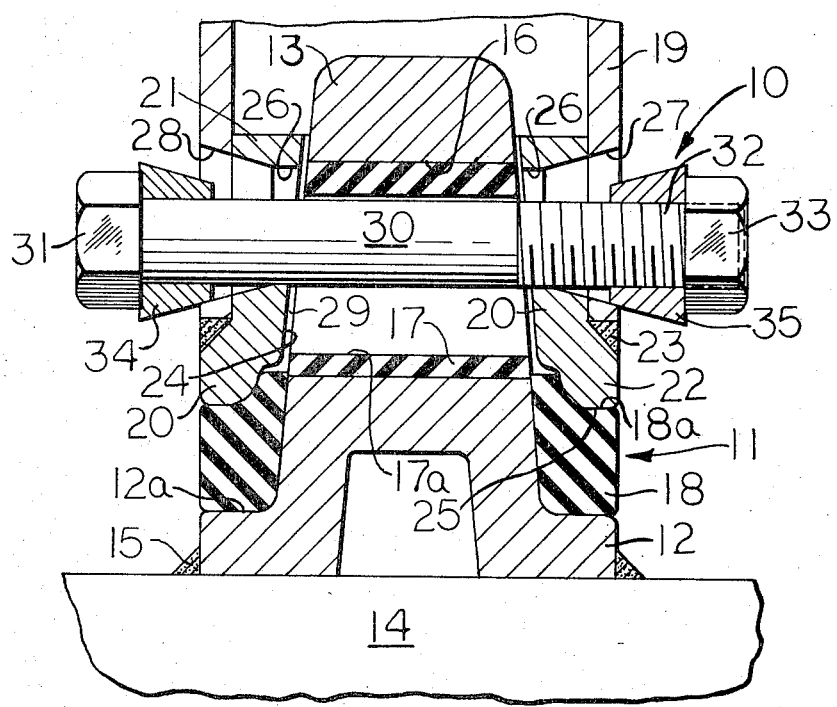
FIG. 2 is a sectional view taken generally along lines II—II of FIG. 1 prior to preloading.

When an attachment such as a canopy or ROPS structure is assembled on the vehicle, the mounting sleeve is placed in telescopic relation to the bayonet portion 13 of mounting base 12, as best illustrated in FIG. 2. In this position, the contoured lower surface of shoulder 25 of sleeve 20 engages the correspondingly contoured surface 18a of the resilient ring 18, to center the post with respect to the bayonet. This limits the downward movement of the post, and centers it with respect to the bayonet 13, so that a clearance 29 is provided between the mounting sleeve and the bayonet to avoid metal-to-metal contact. This also provides sufficient overlap of the relatively large diameter bore 26 with the oblong bore 17a of liner 17 to permit free insertion of suitable retaining and preloading means such as a bolt 30. Bolt 30 includes a head 31 on one end, and a threaded portion 32 at its opposite end for receiving a correspondingly threaded nut 33. Before the bolt is inserted through the openings, camming means such as a tapered sleeve 34 is installed on the bolt in abutment with the head 31. After the bolt is inserted, a second tapered sleeve 35 is installed over the threaded end, and the nut is then threadably engaged with that end of the bolt. As the nut 33 is tightened, the tapered sleeves 34 and 35 are urged into camming engagement with the tapered counterbores 27 and 28 so that the bolt is urged upwardly into loaded contact with the resilient lining 17, and the mounting sleeve 20 is urged downwardly to compress the resilient ring 18.

As best shown in FIGS. 3, 4 and 5, the fully installed bolt 30 is centered in the bore 26 with the tapered sleeves 34 and 35 tightly wedged into the tapered counterbores 27 and 28. In this condition, the ring 18 is compressed approximately three-sixteenths of an inch to generate sufficient preload to avoid bouncing or incidental movement of the post with respect to base 12 and frame 14.

In the example illustrated, the urethane lining 17 preferably has a hardness in the range of 60–90 Durometer, with the rubber ring 18 being in a hardness range of 40–70 Durometer. The Durometer is a unit of hardness developed for the industry for such materials.

From the foregoing description, it is readily apparent that the present invention provides an improved apparatus for simply and quickly preloading a resilient mount in conjunction with the installation of an attachment such as a canopy or the like to a vehicle.

What is claimed is:

1. A resilient mounting assembly for attaching canopy structures to vehicles, said assembly comprising:
    a base member;
    a tapered bayonet mount extending upward from said base member;
    a support member having a tapered socket for receiving said bayonet mount;
    said base member and said support member each including a shoulder disposed in opposed relation;
    resilient means disposed between said shoulders for supporting said support member in spaced relation to said bayonet mount;
    a pair of aligned bores extending transversely through said socket means;
    a bore extending transversely through said bayonet means and partially aligned with said bores in said socket means;
    a bolt extending through said bores; and,
    cam means including a tapered sleeve carried by each end of said bolt and with the small ends thereof terminating in said pair of aligned bores to bias said shoulders toward one another to adjustably preload said resilient means so that said support member is normally supported in its vertical direction wholly by said resilient means.

2. The mounting means of claim 1 wherein one of said bores is oblong.

3. The mounting means of claim 2 comprising resilient means lining said oblong bore.

4. The mounting means of claim 3 wherein said oblong bore is in said bayonet mount.

5. The mounting means of claim 3 wherein said resilient means lining said bore is of a hardness of on the order of 60 to 90 Durometer.

6. The mounting means of claim 4 wherein said bores in said socket means include a tapered portion and a tapered sleeve cooperatively engages each of said tapered portions of said bores.

7. The mounting means of claim 1 wherein the hardness of said resilient means is between 40 to 70 Durometer.

8. The mounting means of claim 1 wherein said resilient means disposed between said shoulders has a hardness within the range of 40 to 70 Durometer; and, said resilient means lining said oblong bore has a hardness within the range of 60 to 90 Durometer.

* * * * *